Oct. 13, 1936.   A. M. DIEZ ET AL   2,057,423
MECHANISM FOR VEERING THE HEAD LAMPS OF AUTOMOBILES
Filed Sept. 23, 1935
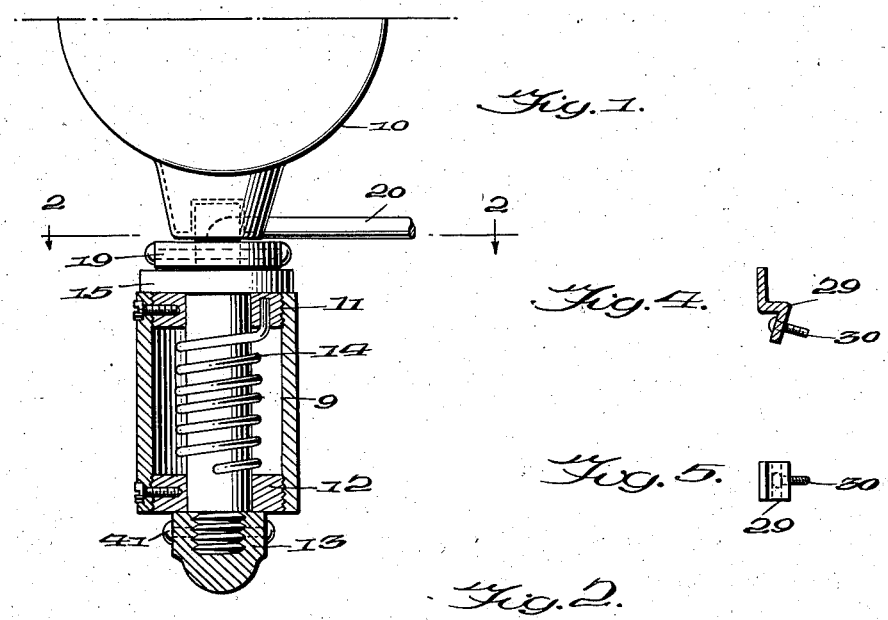
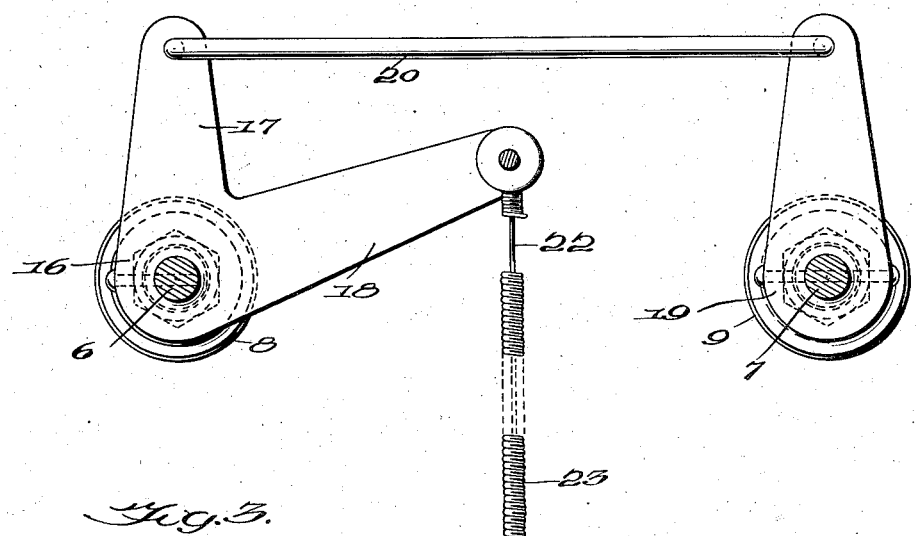
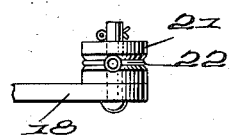
Inventor
Angel M. Diez,
Trude Neuhaus Maz
By Kimmel & Crowell
Attorney Patented Oct. 13, 1936

2,057,423

UNITED STATES PATENT OFFICE 2,057,423

MECHANISM FOR VEERING THE HEAD LAMPS OF AUTOMOBILES

Angel M. Diez and Trude Neuhaus-May, Mexico, D. F., Mexico

Application September 23, 1935, Serial No. 41,788
In Mexico September 4, 1935

1 Claim. (Cl. 240—61.7)

This invention relates to a shifting mechanism for changing the direction of the projected light rays of the headlights of an automotive vehicle.

In the operation of an automotive vehicle over a roadway it is customary to dim the headlights on the approach of a vehicle from the opposite direction to moderate the light rays to prevent the dazzling of the eyes of an approaching driver and in such instances the dimmed headlights do not light the roadway sufficient for safe driving. To overcome this difficulty is the object of the invention and to this end the invention resides in providing, in a manner as hereinafter set forth, a headlight shifting mechanism, under the control of the driver, acting when operated, to quickly direct the light rays towards the right-hand side of the roadway, thereby not only preventing the full glare of the headlights dazzling the eyes of an approaching driver, but at the same time lighting that side of the roadway upon which he is driving whereby collisions and accidents relative to the vehicles approaching each other are reduced to a minimum.

Further objects of the invention are to provide, in a manner as hereinafter set forth a headlights shifting mechanism which is simple in its construction and arrangement, strong, durable, spring controlled, compact, readily installed with respect to the headlights, conveniently operated when desired, and thoroughly efficient in its use.

With the foregoing and other objects which may hereinafter appear the invention consists of the novel construction, combination and arrangement of parts as will be more specifically described and are as illustrated in the accompanying drawing wherein is shown an embodiment of the invention, but it is to be understood that changes, variations and modifications may be resorted to which fall within the scope of the invention as claimed.

In the drawing:

Figure 1 is a fragmentary view in front elevation of one of the headlights of the pair of headlights of an automotive vehicle and further illustrating the adaptation therewith of a shifting means therefor, in accordance with this invention. The said means is shown in elevation and in vertical section, Figure 2 is a top plan view of the headlights shifting mechanism in accordance with this invention, Figure 3 is a detail in side elevation illustrating a grooved block and its mounting forming parts of the mechanism, and Figure 4 is vertical sectional view and Figure 5 a top plan view illustrating the form of stop employed for the levers of the mechanism.

The mechanism includes a pair of spaced parallel vertically disposed rotatable shafts 6, 7 and a pair of spaced parallel upstanding stationary cylinders 8, 9. Each shaft has fixedly secured to its upper end a headlight 10 (only one shown) for movement bodily therewith. Arranged within and anchored against the inner face of each cylinder are upper and lower spaced axially apertured discs 11, 12 respectively. Each of said shafts extend downwardly through the discs positioned in a cylinder. A nut 13 is fixed to the lower end of each shaft and abuts a lower disc. A controlling spring 14 is employed for each headlight and is positioned within a cylinder, encompasses a shaft intermediate the ends of the latter, has its lower end fixed to the shaft within the cylinder and its other end anchored to an upper disc. Each shaft is formed with a laterally extending annular boss 15 which seats on an upper disc.

Secured to the shaft 6, between its boss and the headlight which is fixed to the upper end of such shaft, is an operating lever 16 of the double arm angle-shaped type which functions to shift shaft 6 against the action of its controlling spring. The arms of the lever 16 are indicated at 17, 18. The arm 17 is of less length than that of arm 18. Secured to the shaft 7, between its boss and the headlight which is fixed to the upper end of such shaft, is lever 19 of the one arm type and which functions to shift shaft 7 against the action of its controlling spring. The arm 17 of lever 16 is coupled to the lever 19 by a transmission rod 20 to provide for the headlights being shifted in unison when lever 16 is operated.

Carried by the arm 18 of lever 16 is a grooved block 21. Within the grove of block 21 is secured the looped outer end of a flexible pull member 22 for operating lever 16 against the action of the controlling springs 14. The member 22 passes through a flexible tubing 23 extending outwardly from and coupled to the instrument board 24 of the vehicle by the means 25. The rear end of member 22 carries a handle 26 provided with suitable means, as indicated at 27 coacting with a collar 28 for retaining the headlights in adjusted position.

There is associated with the arm 17 of lever 16 and with the lever 19 a stop member 29. The members 29 are anchored stationary by the holdfast means 30 in the return paths of travel of arm 17 and lever 19 for limiting the return movement of these latter to an extent to have the headlights assume their normal position. The return movement of arm 17 and lever 19 is caused by the action of the controlling springs.

What we claim is:

In a mechanism for simultaneously adjusting a pair of headlights, a pair of rotatable shafts, a headlight fixedly secured to the upper end of each shaft for bodily moving with the shaft, a pair of vertical cylinders, upper and lower spaced axially apertured discs arranged within each of and anchored against the inner face of said cylinders, said shafts extending downwardly through said discs, nuts fixed at the lower ends of said shafts for abutting said lower disc, controlling springs for said headlights, said springs being positioned in said cylinders encompassing said shafts intermediate the ends of the latter, having their lower ends anchored to said shafts within the cylinders and their upper ends anchored to said upper disc, said shafts being formed with laterally extending annular bosses seated on said upper discs, an operating angle-shaped double arm lever fixed to one of said shafts between its boss and the headlight carried thereby, a one arm lever fixed at one end to the other of said shafts between the boss on the latter and the headlight anchored to such shaft, means for connecting one of the arms of said operating lever to the other of said levers to provide for the shifting of the headlights in unison against the action of their controlling springs, means connected to the other arm of said operating lever for actuating said lever, the said other arm being of greater length than the first mentioned arm; said last mentioned means including a grooved block mounted on the longer arm and a flexible pull member having one end connected with said block, and spaced stop means associated with the short arm of the operating lever and with the said other lever for limiting the return movement of said headlights.

ANGEL M. DIEZ.
TRUDE NEUHAUS-MAY.